United States Patent
Jaganjac (10) Patent No.: US 9,325,208 B2
(45) Date of Patent: Apr. 26, 2016

(54) STATOR WITH RADIALLY MOUNTED TEETH

(75) Inventor: Esad Jaganjac, Hampton (GB)

(73) Assignee: PROTEAN ELECTRIC LIMITED (GB)

( * ) Notice: Subject to any disclaimer, the term of this patent is extended or adjusted under 35 U.S.C. 154(b) by 572 days.

(21) Appl. No.: 13/577,230

(22) PCT Filed: Feb. 3, 2011
(Under 37 CFR 1.47)

(86) PCT No.: PCT/IB2011/050477
§ 371 (c)(1),
(2), (4) Date: Oct. 18, 2013

(87) PCT Pub. No.: WO2011/095945
PCT Pub. Date: Aug. 11, 2011

(65) Prior Publication Data
US 2014/0217837 A1    Aug. 7, 2014

(30) Foreign Application Priority Data
Feb. 4, 2010  (GB) .................................. 1001806.7

(51) Int. Cl.
H02K 1/18 (2006.01)
H02K 1/28 (2006.01)
H02K 1/14 (2006.01)
H02K 1/06 (2006.01)
H02K 15/06 (2006.01)

(52) U.S. Cl.
CPC .. *H02K 1/18* (2013.01); *H02K 1/06* (2013.01); *H02K 1/148* (2013.01); *H02K 1/28* (2013.01); *H02K 15/062* (2013.01); *Y10T 29/49009* (2015.01)

(58) Field of Classification Search
None
See application file for complete search history.

(56) References Cited

U.S. PATENT DOCUMENTS

| | | | | |
|---|---|---|---|---|
| 4,554,491 A * | 11/1985 | Plunkett | ................... | H02P 6/06 310/186 |
| 7,199,492 B2 * | 4/2007 | Hashimoto | ............ | H02K 41/03 310/12.25 |
| 2003/0155834 A1 | 8/2003 | Enomoto et al. | | |
| 2004/0084989 A1 | 5/2004 | Schunk et al. | | |
| 2009/0256430 A1 * | 10/2009 | Farnia | ................... | H02K 1/148 310/44 |

FOREIGN PATENT DOCUMENTS

| | | |
|---|---|---|
| EP | 1602554 A2 | 12/2005 |
| GB | 148748 A | 10/1920 |

(Continued)

OTHER PUBLICATIONS

Intellectual Property Office, Patent Acts 1977:Search Report Under Section 17, Mar. 2, 2010, United Kingdom.

(Continued)

*Primary Examiner* — Tran Nguyen
(74) *Attorney, Agent, or Firm* — The Mason Group Patent Specialists LLC; Valerie M. Davis (57) ABSTRACT

A stator for an electric motor or generator comprising a circumferential support having a plurality of protrusions circumferentially distributed about the support; and a plurality of teeth arranged to receive coil windings, wherein each tooth includes a recess with interlocking means formed within the recess for engaging with a protrusion mounted on the circumferential support in a radial direction.

17 Claims, 11 Drawing Sheets

(56) References Cited

FOREIGN PATENT DOCUMENTS

| GB | 759960 A | 10/1956 |
| JP | 56006636 A | 1/1981 |
| JP | 2000134831 A | 5/2000 |
| JP | 2004320824 A | 11/2004 |

OTHER PUBLICATIONS

PCT International Search Report, Aug. 8, 2011, European Patent Office.

* cited by examiner

STATOR WITH RADIALLY MOUNTED TEETH

The present invention relates to a stator, and in particular a stator for an in-wheel electric motor or generator.

Stators are well known as the stationary part of an electric motor or electric generator about which a rotor turns. Stators generally comprise a magnetic component and other structural components. Electric motors work on the principle that a current carrying wire will experience a force in the presence of a magnetic field. Typically a rotor, carrying a set of permanent magnets, is arranged to rotate about a set of coils that are arranged to carry an electric current, resulting in the rotor rotating about the stator and generating movement. It will be appreciated that it is also possible for the rotor to carry a set of coils and the stator to carry a set of permanent magnets.

Figure 1:
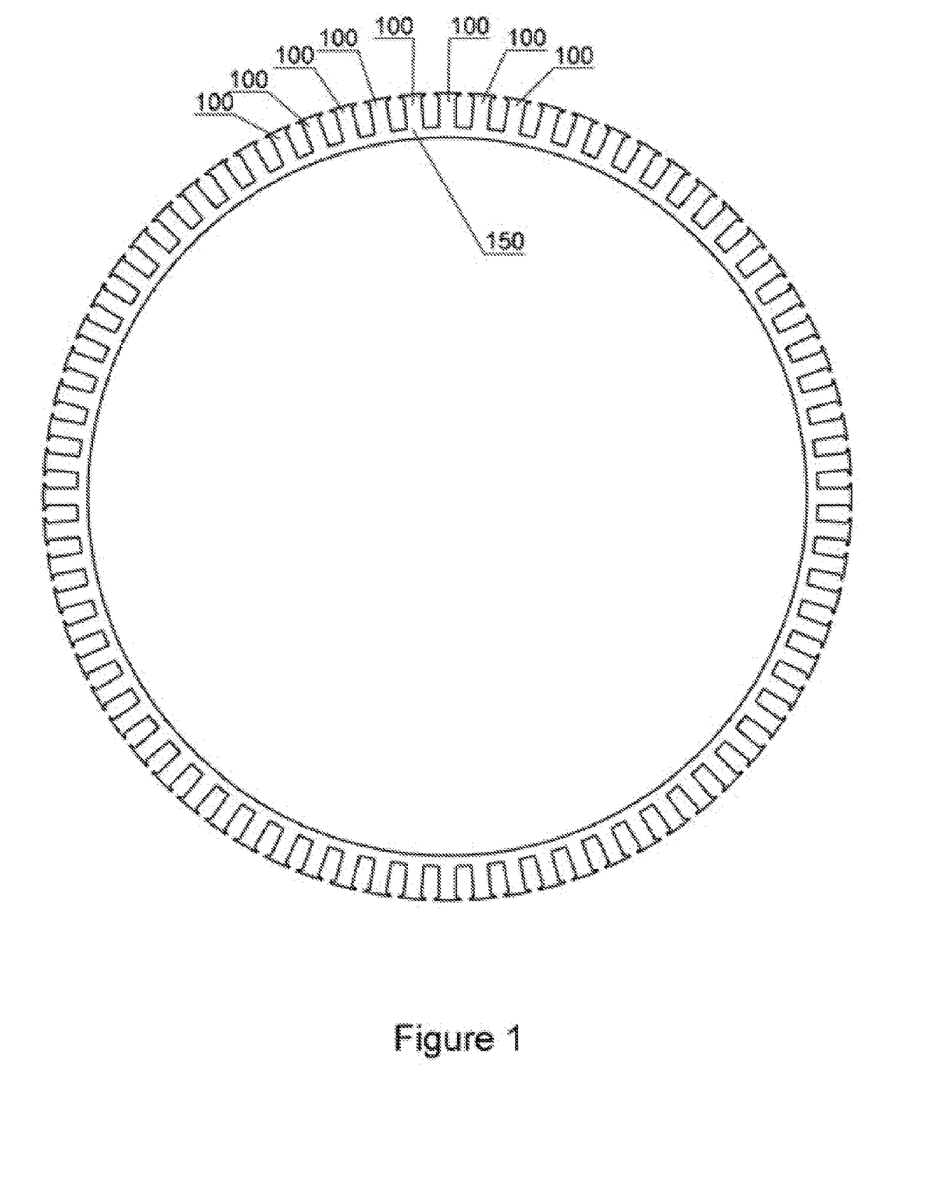
FIG. 1 illustrates a prior art example of a stator formed as a single piece with integral teeth.

An example of a stator, which is arranged to be mounted within a rotor, is shown in FIG. 1. FIG. 1 shows the back-iron of a stator formed of a single piece of material, for example from PM (powder metal) or more commonly built up of a number of identical laminations. The protrusions 100 from the circular support 150 (also known as a back iron or back ring) are known as "teeth" and are used to receive a plurality of coil windings. To increase performance of a motor it is desirable to optimise the cross-section of the coil windings, which would have the effect of reducing resistance, thereby reducing heat generation. Additionally, with the coil windings being in closer proximity, this would have the effect of improving thermal conductivity, which would have the effect of increasing motor efficiency with improving continuous performance.

However, with an arrangement such as that shown in FIG. 1, where the entire stator is formed of a single solid piece, it will be appreciated that there is a limited amount of space to physically wind the wire coils about the teeth. Therefore, it is common in such arrangements for there to be gaps between the coils of adjacent teeth, which is inefficient since this space could otherwise be filled with wire coils to increase the flux density.

Additionally, traditional ways of providing coil insulation between a stator and coil windings can result in poor thermal conductivity, which can limit the performance of an electric motor.

Further, large single piece stators typically require a complex winding machine and complex winding process to perform the required coil windings.

Accordingly, it is desirable to improve this situation.

In accordance with an aspect of the present invention there is provided a stator according to the accompanying claims.

The invention provides the advantage of allowing individual stator teeth to be individually wound prior to being mounted to the stator back-iron, thereby allowing the space between coils on adjacent stator teeth to be minimised Further, by radially mounting a stator tooth to a stator back-ring using interlocking features on the stator tooth and stator back-ring provides the further advantage of allowing a stator tooth to be mounted to a stator back-iron without the need for additional mounting components to secure the teeth and back-iron together, thereby reducing manufacturing complexity and weight.

Additionally, by having a stator tooth that is mountable to a stator back-iron allows an insulation layer to be over moulded to the stator tooth prior to the mounting process. The use of an over moulding layer applied to single stator tooth can minimise the risk of any air gaps forming between the insulation layer and the stator tooth, thereby providing an electrical insulation layer between the coils and the stator while also improving thermal conductivity.

The present invention will now be described, by way of example, with reference to the accompanying drawings, in which.

Although embodiments of the invention will now be described in relation to a stator for an electric motor, it should be appreciated that the invention applies equally to rotor arrangements in the instance of electric motors in which the rotor carries the coils. The invention also applies equally to electric generators. Although the present embodiment describes an electric motor having a stator and rotor, where the stator and rotor have a circumferential support, the invention is equally applicable to electric motors having stators and rotors with a different configuration, for example a linear electric motor. Accordingly, the term rotor is intended to cover the moving component of an electric motor irrespective of the shape of that component and as such is intended to cover a forcer in a linear electric motor.

Figures 2, 2A, 2B:
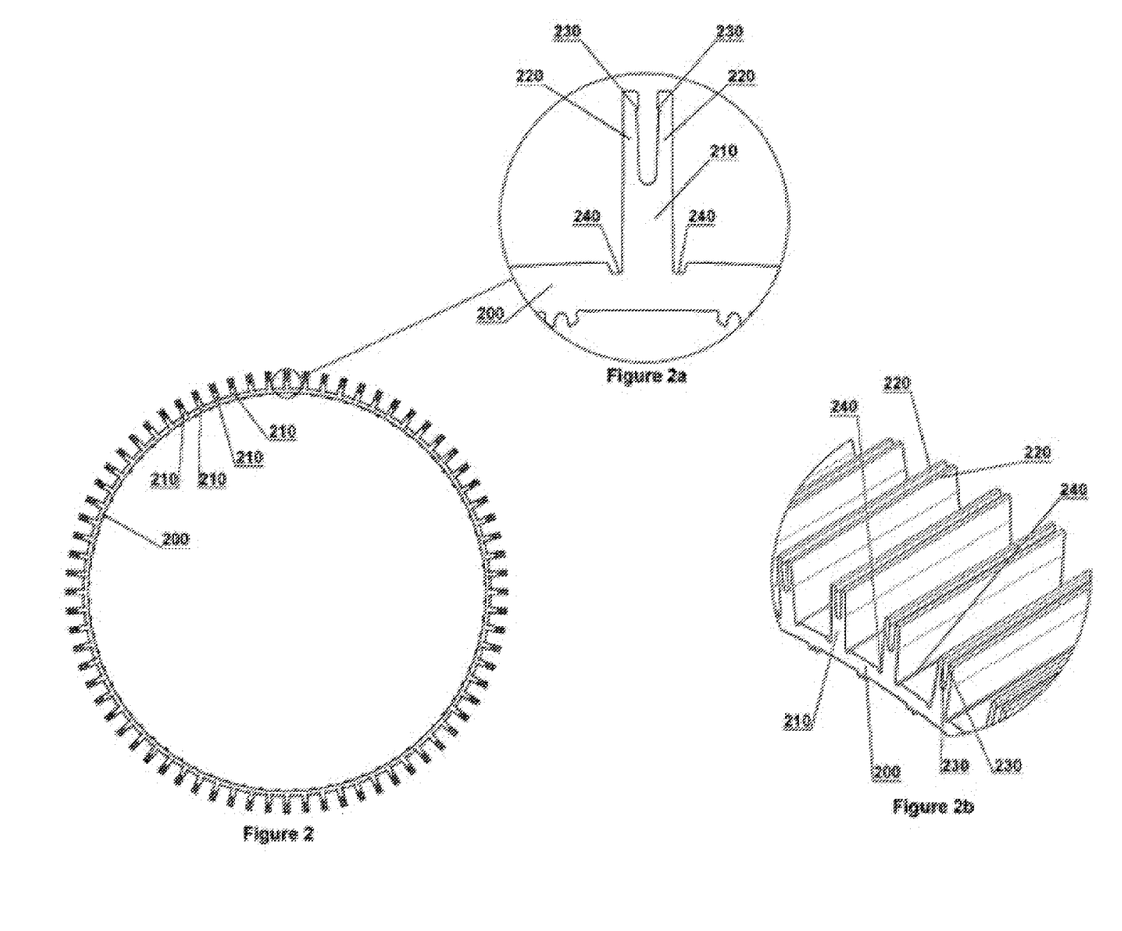
FIGS. 2, 2a, 2b illustrates a stator circumferential support according to an embodiment of the present invention.

In accordance with a first embodiment of the invention, FIG. 2 illustrates a circumferential support 200. Distributed about the outer circumference of the circumferential support 200, that is to say stator back-ring, are a plurality of protrusions 210 that extend in a radial direction, which are illustrated in greater detail in FIGS. 2a and 2b. The plurality of protrusions 210 extend outwardly away from the outer surface of the stator back-iron 200.

The stator back-iron 200, including the protrusions 210, are formed as a single piece, integral, structural component. For example the stator back-iron 200 can be moulded from powder metal, or more commonly, built up of a number of identical laminations, where the laminations will typically be manufactured from sheets of steel, such as electrical steel, however any material with appropriate strength and electromagnetic properties can be used. The laminations may also have an insulating coating on the surface and along the curved interface shape between teeth stacks and stator back-ring (i.e. circumferential support 200) to prevent eddy currents from flowing between the laminations.

The laminations can be produced by any suitable means, for example stamping or cutting the desired shape from a sheet of the required material or laser etching. As an example, the laminations may have a thickness of between 0.3 and 0.4 mm and preferably around 0.35 mm.

Each of the protrusions 210 formed on the stator back-iron 200 are arranged to receive a stator tooth, where each of the protrusions and respective stator teeth include engagement means to allow the respective stator teeth to be mounted to a respective protrusion 210 in a radial direction, as described below.

For the purposes of the present embodiment, formed on the end portion of each of the protrusions 210, farthest away from the stator back-iron 200, are two resilient elements 220 extending radially away from the stator back-iron 200, where a gap is formed between the two resilient elements 220. The gap between the two resilient elements 220 forms a radial slot at the end of the projections that is substantially orthogonal to the circumferential plane of the stator back-iron 200. The radial slot is arranged to receive a stator tooth engagement element, as described below.

The end portion of each of the resilient elements 220, that is to say the portion of the resilient elements 220 furthest from the stator back-iron 200, include a projecting portion 230 on an inner surface of the resilient elements 220 that extend towards each other in a circumferential direction with respect to the stator back-iron that are arranged to latch with a stator tooth engagement element, as described below.

Preferably, at the base of a protrusion 210, and on each side, is formed a groove 240 (i.e. a recess), where the groove 240 runs along the stator back-iron at the base of the protrusion 210 in substantially an orthogonal direction to the circumferential plane of the stator back-iron 200. Each groove 240 formed in the stator back-iron is arranged to receive an end portion of a stator tooth wall section, as described below.

Figure 3:
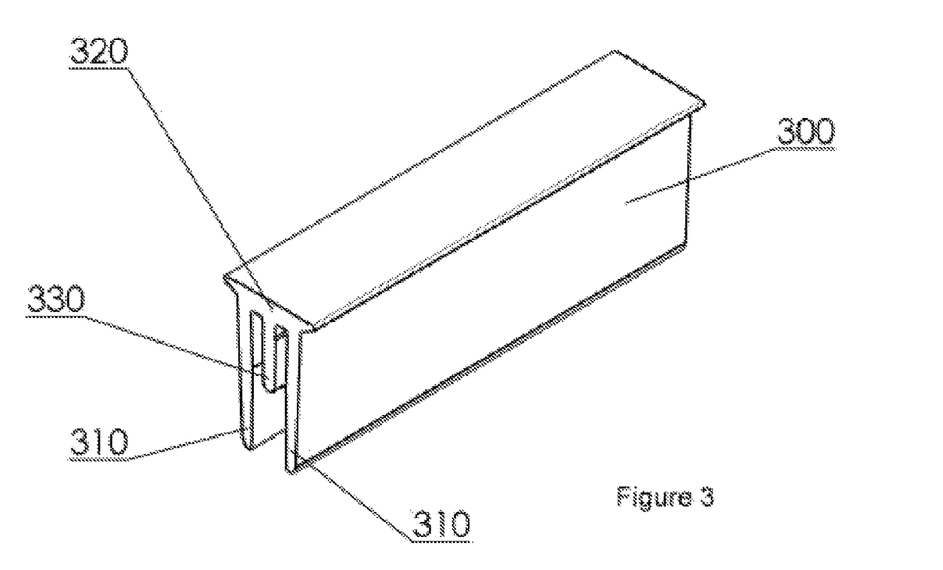
FIG. 3 illustrates a stator tooth according to an embodiment of the present invention.

FIG. 3 illustrates a stator tooth 300 for mounting to the stator back-iron 200 illustrated in FIG. 2. The stator tooth 300 includes two wall sections 310 that are coupled together via a stator tooth top portion 320. To aid the retention of coil windings mounted on the stator tooth 300, the top portion 320 of the stator tooth extends laterally over the tooth wall sections 310 to form a laterally extending stator tip.

A recess is formed between the two tooth wall sections 310 of the stator tooth, with an engagement element 330 formed in the recess. The engagement element 330 is arranged to engage with the resilient elements 220 of a projection, as described below.

The stator tooth engagement element 330 extends from the centre portion of the stator tip 320 down into the recess formed between the two tooth wall sections 210, with the engagement element 330 tapering outwardly from the tip of the engagement element 330 up towards the stator tip 320. The top portion of the engagement element 330, which abuts the stator tip, is arranged to have a narrowed section that is configured to interlock with the upper portions of the resilient elements 220 of a projection 210. The profile and dimensions of the slot formed between the two resilient elements 220 of a protrusion 210 is arranged to substantially correspond to the outer profile and dimensions of the engagement element 330 formed in the recess of a stator tooth 300.

As the stator teeth 300 are separate from the stator back-iron 200 they can be pre-wound with coil windings before the stator teeth 300 are mounted to the stator back-iron 200 with the advantage that the winding of coils on the teeth is easier than if the teeth were integral to the stator support. For example, the slot fill (i.e. the amount of copper wire that fills the slots between stator teeth) for conventional electric motor designs will be of the order of 37%. However, by allow winding of coils to be applied to a stator tooth without the space constraints imposed when the stator is formed as a single piece with integral teeth the slot fill can be increase to approximately 54% or more.

To mount the stator teeth 300 to the stator back-iron 200 the stator teeth 300 are radially pressing onto a respective protrusion 210 formed on the stator back-iron 200. Sufficient radial force is applied to a stator tooth 300 to force the stator tooth engagement element 330 to interlock with the two resilient elements 220 of a protrusion 210.

In particular, when a stator tooth 300 is to be mounted to the stator back-iron 200 the stator tooth 300 is positioned over a protrusion 210 so that the tip of the stator tooth engagement element 330 engages with the gap formed between the top of the two resilient elements 220 of a protrusion 210.

The stator tooth 300 is then radially pressed against the protrusion 210 causing the tapered portion of the engagement element 330 to apply a tangential force to the inner surfaces of the resilient elements 220, thereby causing the two resilient elements 220 to be forced apart allowing the engagement element 330 to move down between the two resilient elements 220.

Figure 4:
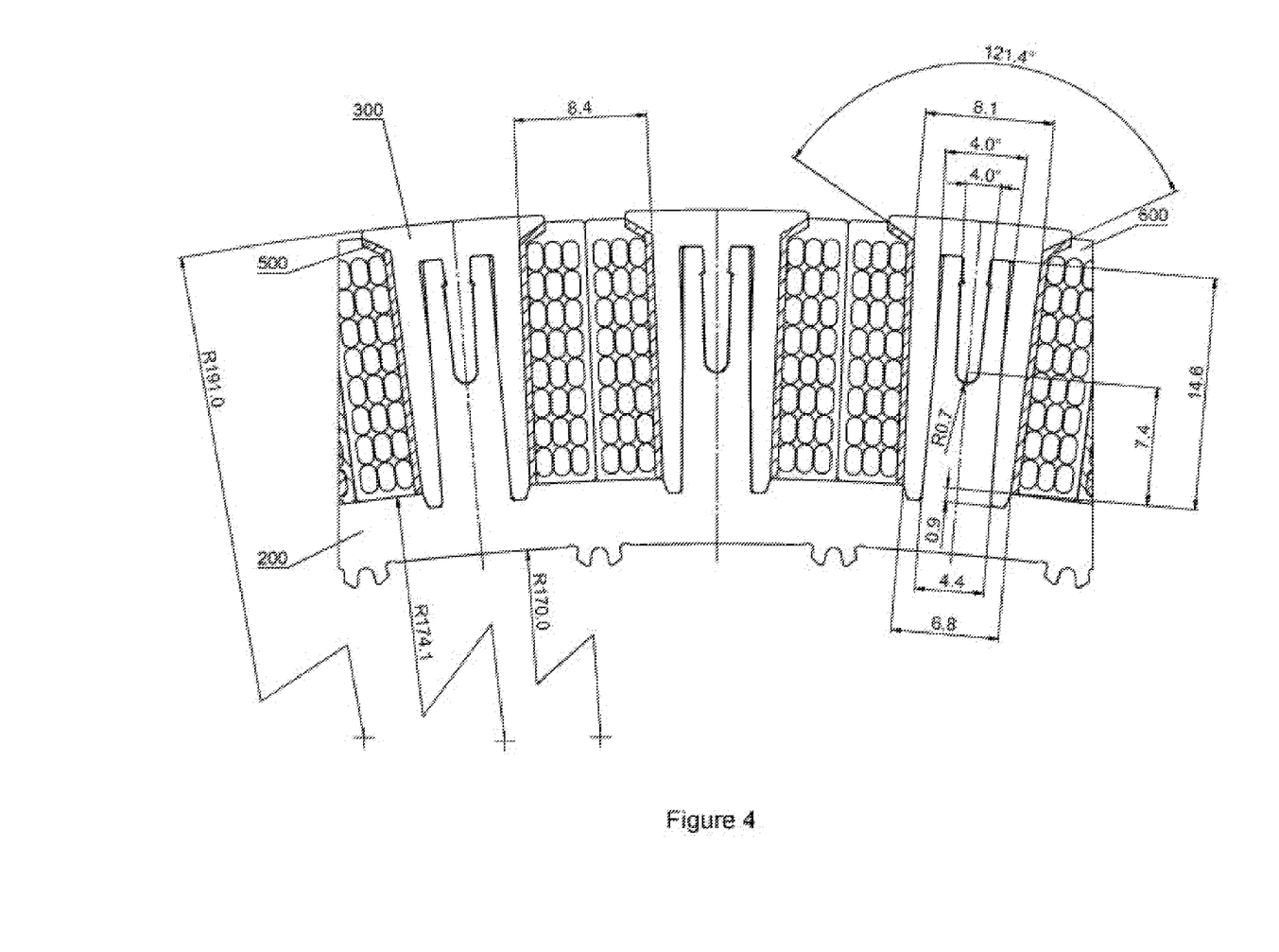
FIG. 4 illustrates a plurality of stator teeth mounted to a stator back-iron in accordance with an embodiment of the present invention.

As the profile and dimensions of the engagement element 330 matches that of the slot formed between two resilient elements 220, once the stator tooth 300 has been fully inserted on the protrusion 210 the spring force in the resilient elements 220 force the projection portions 230 on the inner surfaces of the resilient elements 220 into the narrowed section of the engagement element 330, thereby interlocking the stator tooth 300 and the stator back-iron protrusion 210 and preventing the removal of the stator tooth 300 from the stator back-iron 200. The end portions of each of the stator tooth wall sections 310 sit in a respective recess formed at the base of the protrusion 210, thereby providing support against tangential forces applied to the stator tooth 300. FIG. 4 provides an illustration of three stator teeth that have been mounted to a respective protrusion on a stator back-iron 200. For purposes of illustration, the dimensions of the illustrated stator features are as shown in FIG. 4, however these dimensions will vary depending on the required motor characteristics/performance.

Preferably, an adhesive is applied to one or more surfaces on a stator tooth 300 and/or a protrusion 210, which abut when the stator tooth 300 is mounted to the protrusion 210, for example on an outer surface of one or both of the resilient elements 220. The application of an adhesive to one or more surfaces of the stator tooth 300 and/or protrusion 210 helps to minimise micro-movement of the stator tooth 300 and local vibration of the tooth 300 relative to the stator back-iron 200. To aid thermal conductivity between the stator tooth 300 and the stator back-iron 200 the adhesive is preferably selected to have a good thermal conductivity. The adhesive can also help to electrically isolate the stator tooth 300 from the protrusion 210, thereby helping to minimise eddy currents between stator tooth 300 and the stator back-iron 200.

Figure 5:
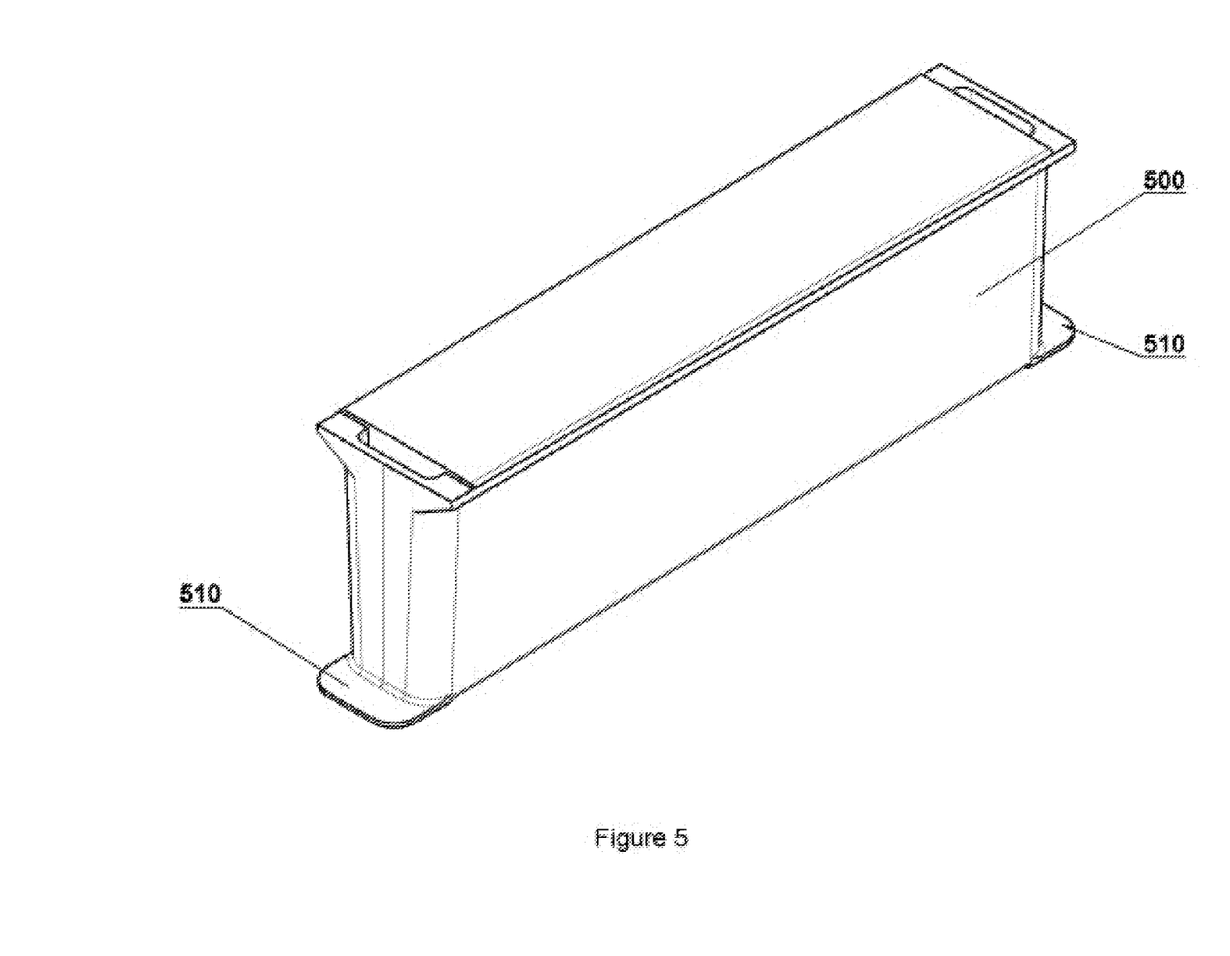
FIG. 5 illustrates the over-moulding of a stator tooth according to an embodiment of the present invention.

FIG. 5 illustrates a further preferred feature, to aid electrically isolation between the coil windings and the stator tooth 300 the stator tooth 300 is encapsulated with an insulating material 500 using over-moulding (i.e. the stator tooth is over-moulded). Preferably the insulating material 500 will be a plastic having a good thermal conductivity, high temperature deflection and good dielectric strength, for example liquid crystal polymer. Preferably the over-moulded material is selected to have good thermal conductive properties, thereby aiding thermal conductivity between the coil windings and the stator tooth 300. Preferably, the over-moulding process will include features that aid the retention of the coil windings on the stator tooth, for example a ridge 510 formed at the bottom of the over-moulding.

Once the stator tooth 300 has been over-moulded, coil windings are applied to the stator tooth.

To help electrically isolate coil windings mounted on adjacent stator teeth 300 preferably a further over-moulding is then applied to the coil windings prior to the mounting of a stator tooth 300 to a protrusion 210.

Figure 6:
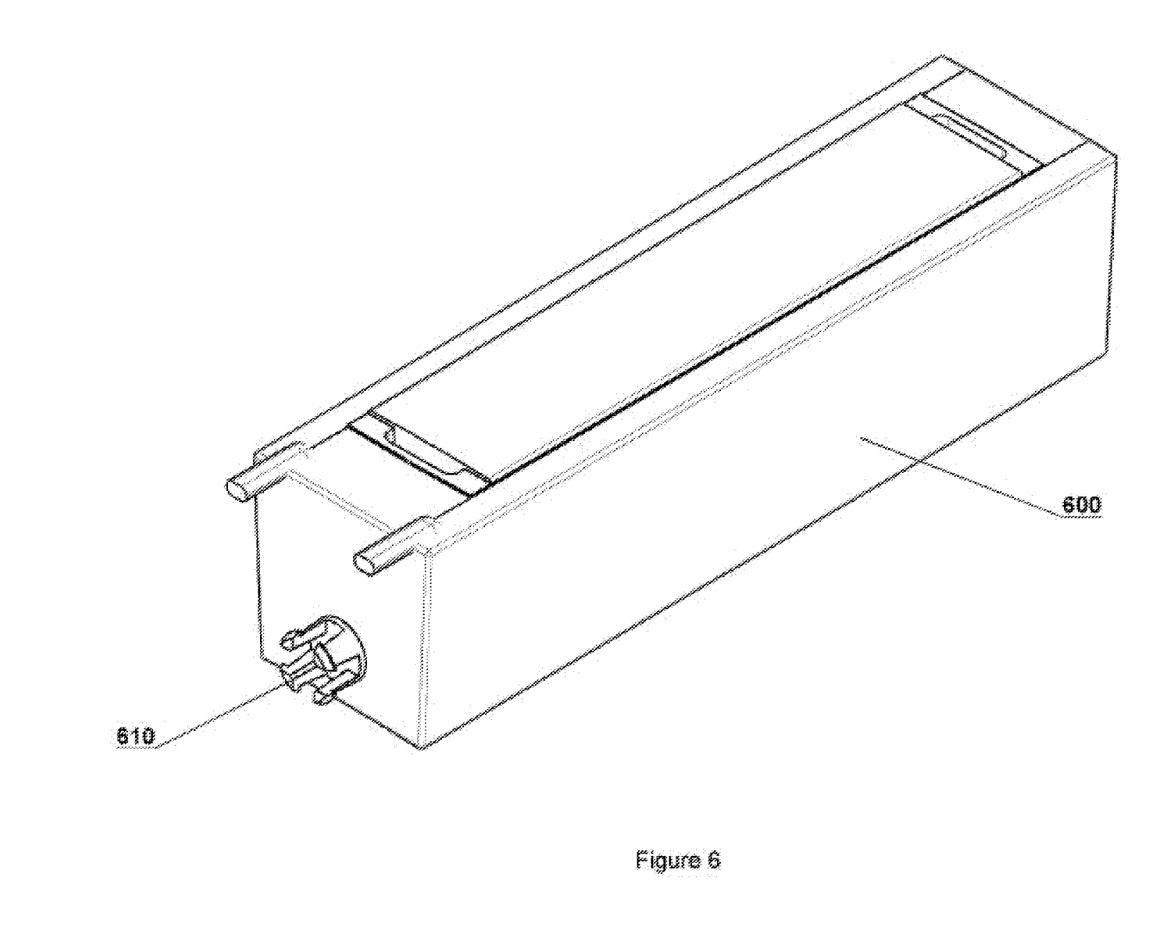
FIG. 6 illustrates the over-moulding of coil windings according to an embodiment of the present invention.

As illustrated in FIG. 6, preferably the over-moulding 600 applied to the coil windings includes a mounting point 610 for allowing a copper track grid to be mounted to the over-moulding 600 once the stator tooth 300 has been mounted to the stator back-iron 200. The purpose of the copper track grid is to provide phase lead routing to a power board, where a power board is arranged to control the current to coil windings. The copper track grid is also arranged to allow a power board to be easily welded or soldered to the copper track grid, thereby allowing a power board to be easily mounted to an stator.

Figure 7A:
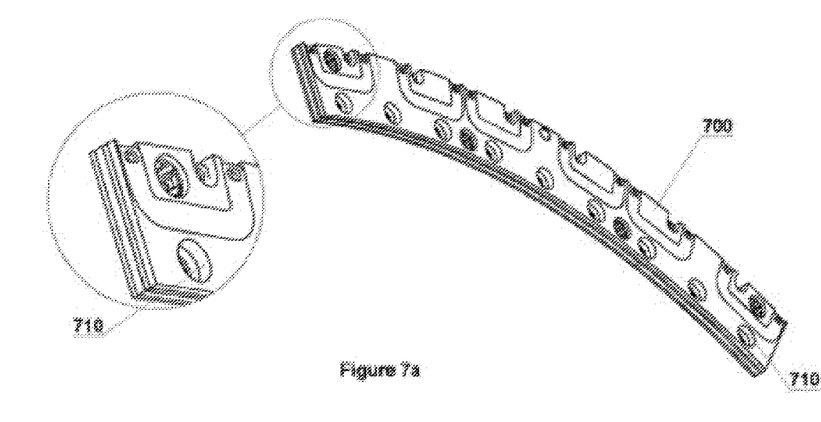
FIG. 7a, 7b illustrates a copper track grid.
Figure 7B:
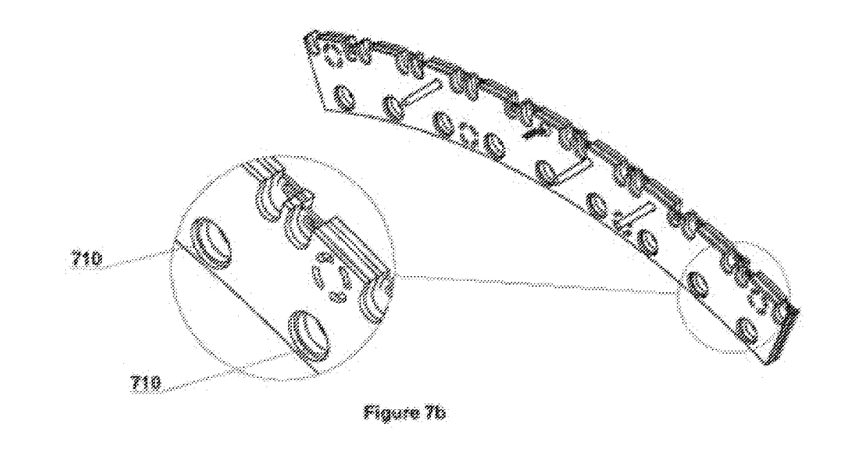

FIGS. 7a and 7b illustrate a copper track grid 700. FIG. 7a illustrates a perspective view of the copper track grid 700 looking at the side of the copper track grid 700 that is mounted to a stator. FIG. 7b illustrates a perspective view of a copper track grid 700 looking at the side of the copper track grid 700 that faces away from the stator when the copper track grid 700 is mounted to a stator.

Figure 8:
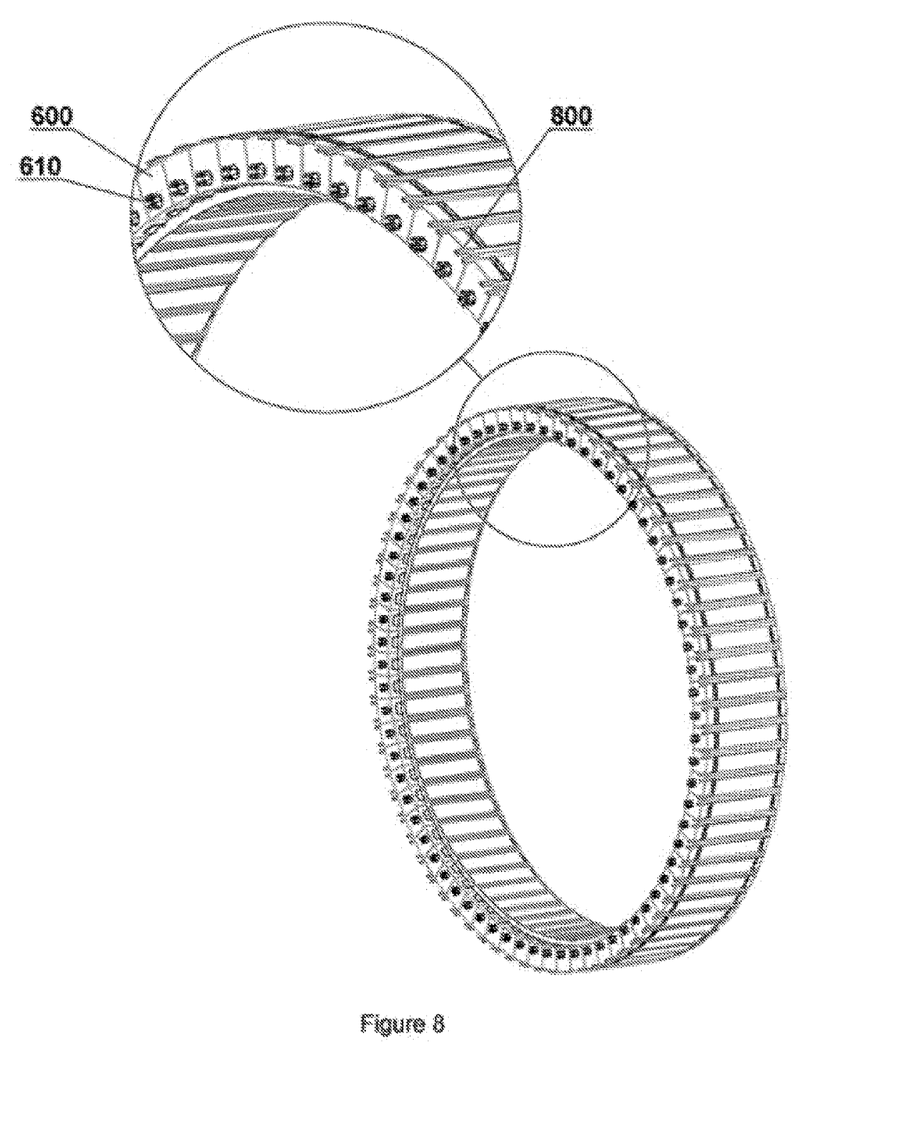
FIG. 8 illustrates a stator according to an embodiment of the present invention.

The copper track grid 700 includes nine mounting points 710 for mounting to nine stator teeth 300, where the copper track grid mounting points 710 are arranged to be fixed to respective mounting points 610 formed on the over-moulding applied to stator tooth coil windings Once the over-moulding 600 has been applied to the coil windings the stator teeth 300 are mounted on to the stator back-iron 200, as described above. FIG. 8 illustrates an assembled stator where over-moulded stator teeth 300 have been mounted to the stator back-iron 200. The ends 800 of the coil windings extend from the top of the over moulding 600 to allow coupling to the copper track grid 700.

Figure 9:
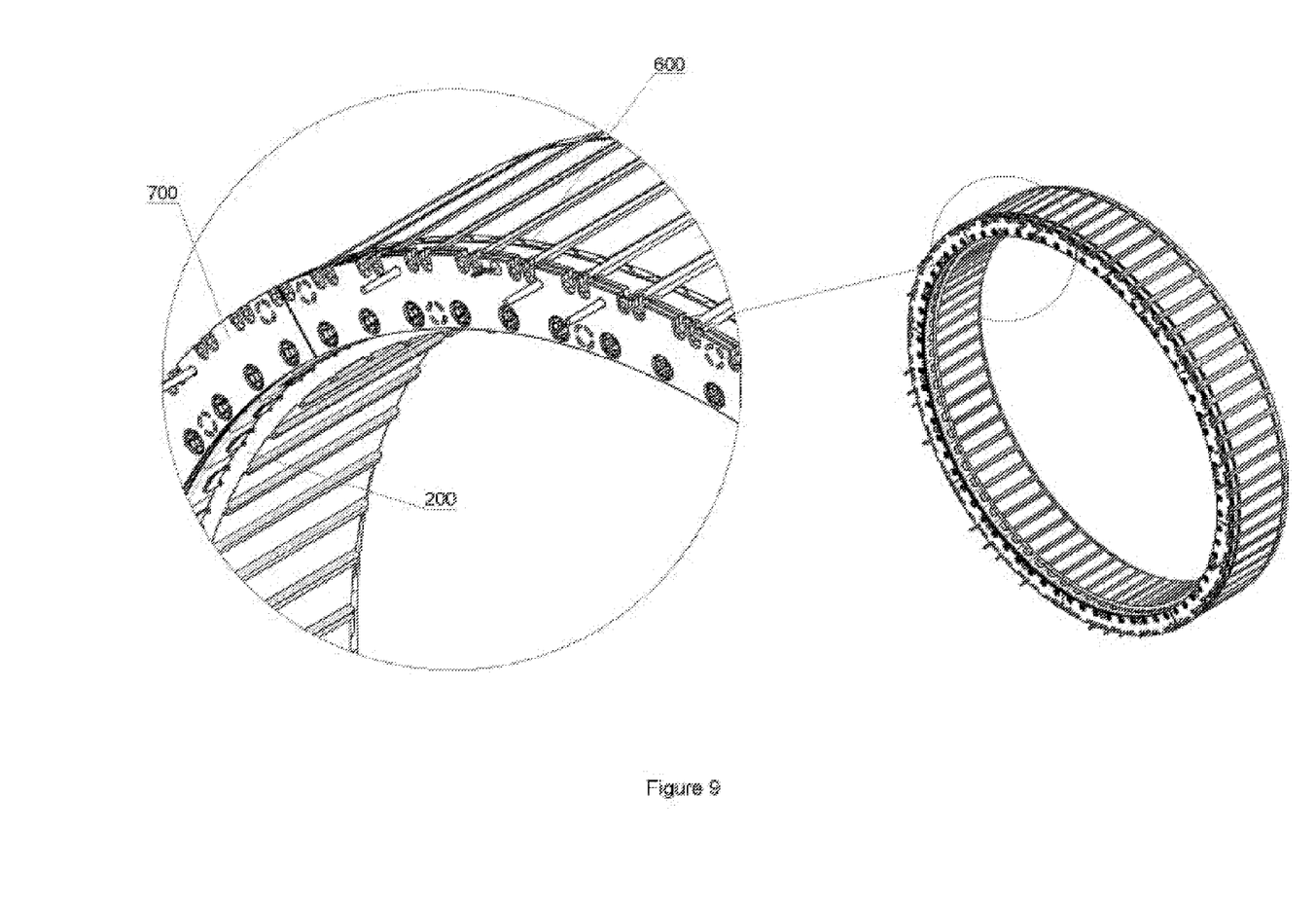
FIG. 9 illustrates a stator according to an embodiment of the present invention.
Figure 10:
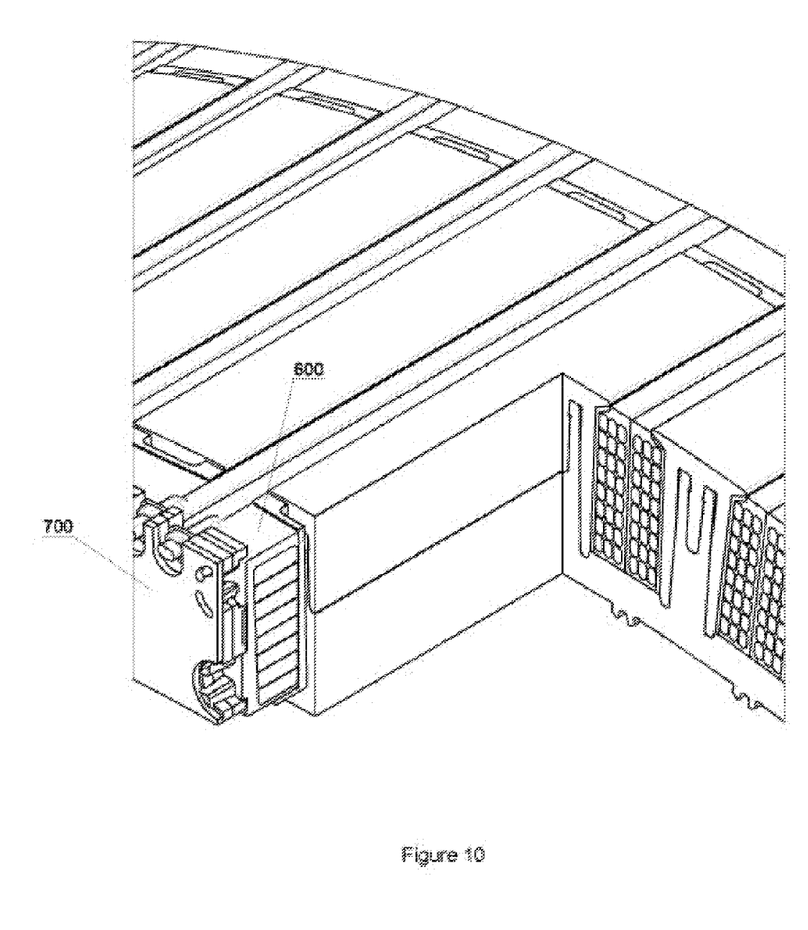
FIG. 10 illustrates a cross-section of a stator according to an embodiment of the present invention.

Once the stator teeth 300 have been mounted to the stator back-iron 200, copper track grids 700 are mounted to the mounting points 610 formed on the over-moulding placed over the coil windings, as illustrated in FIG. 9. For the purposes of the present embodiment, the copper track grid 700 and over-moulding fixing points 610 are push-fit, thereby allowing the copper track grid 700 to be push fit onto the stator teeth over-moulding 600. A cross-section view of the stator in which over-moulded stator teeth have been mounted to a stator back-iron and with a copper track grid mounted to the stator teeth is illustrated in FIG. 10.

Figure 11:
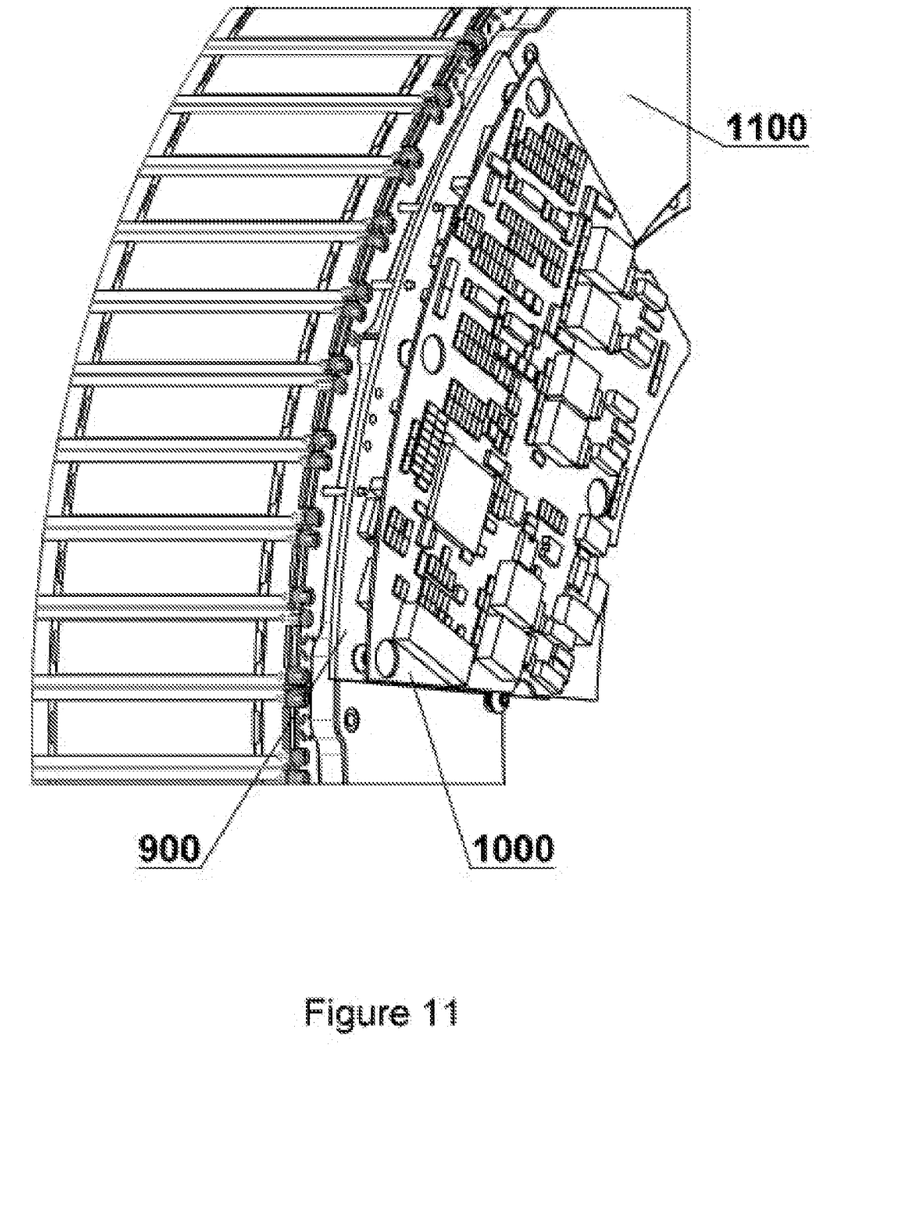
FIG. 11 illustrates a stator according to an embodiment of the present invention.

As illustrated in FIG. 11, a control board 1000 and power board 900, which act as an inverter, are mounted adjacent to the copper track grid, where connectors on the copper track grid are welded or soldered to power board receptacles or connecting holes. As such, the copper track grid acts as a mounting ring for mounting an inverter to the stator. The control board 1000 and power board 900 are arranged to control the current flow in coil windings. A single control board and power board could be arranged to control current flow in all motor coil windings or a subset of coil windings. If a single control board and power board are arranged to control current in a subset of coil windings, preferably the electric motor would include a plurality of control boards and power boards to control the current flow in the different subset of coil windings.

In this embodiment the power board 900 is welded or soldered to a copper track grid 700 and a control board 1000 is arranged above the power board 900 and fitted to the power board 900 using threaded spacers. However, in an alternative embodiment the control board and power board could be combined into a single board.

Preferably, to aid cooling of the electric motor, a heat sink 1100 is mounted to the stator.

For the purposes of the present embodiment, a fully assembled stator includes 72 stator teeth, however any number of teeth can be used, where preferably the number is between 50 and 100.

It will be appreciated that whilst the invention as shown in the figures and substantially as described relates to an arrangement in which the rotor surrounds a stator and rotates around it, it is fully within the scope of the current invention for the stator to surround the rotor with the winding teeth protruding radially inwards towards the centre of the stator rather than radially outwards.

Also, whilst the invention has been described in relation to stators for electric motors, the invention is equally applicable to elements of an electric generator.

Although stators embodying the present invention can be of any size, preferred sizes will depend upon the desired size of the electric motor or generator. For example, for an electric motor having an 18" diameter, the outside radius of the stator may be around 191 mm (i.e. that stator diameter is 382 mm). For a 20" diameter motor the outside diameter of the stator may be around 424 mm and for a 14" diameter motor the outside diameter may be around 339 mm.

A stator constructed according to the above embodiment finds particular utility in electric motors for electric vehicles. In particular, embodiments of the invention may be incorporated into road going electric vehicles and more specifically electric vehicles having one or more in-wheel electric motors.

The invention claimed is:

1. A stator or rotor for an electric motor or generator comprising a support having a plurality of protrusions distributed about the support; and a plurality of teeth arranged to receive coil windings, wherein each tooth includes a recess with interlocking means formed within the recess for engaging with a protrusion on the support for allowing each tooth to be mounted to a protrusion in a direction perpendicular to a surface of the support and in the direction the protrusion extends away from the surface of the support, wherein each of the plurality of protrusions are resiliently deformable and arranged to engage with interlocking means within the recess of each tooth, wherein the respective interlocking means do not extend beyond the recess formed within the respective teeth.

2. A stator or rotor for an electric motor or generator comprising a circumferential support having a plurality of protrusions distributed about the circumferential support; and a plurality of teeth arranged to receive coil windings, wherein each tooth includes a recess with interlocking means formed within the recess for engaging with a protrusion on the circumferential support for allowing each tooth to be mounted to a protrusion in a radial direction, wherein each of the plurality of protrusions are resiliently deformable and arranged to engage with interlocking means within the recess of each tooth, wherein the respective interlocking means do not extend beyond the recess formed within the respective teeth.

3. A stator or rotor according to claim 2, wherein the plurality of protrusions extend in a radial direction away from the circumferential support.

4. A stator or rotor according to claim 2, wherein a resiliently deformable protrusion includes two resiliently deformable elements arranged to engage with interlocking means within the recess of each tooth.

5. A stator or rotor according to claim 4, wherein the two resiliently deformable elements are formed on an end portion of each of the protrusions.

6. A stator or rotor according to claim 4, the two resiliently deformable elements include a projection portion on an inner surface that extend towards each other, wherein the projection portions are arranged to latch with a stator tooth engagement element.

7. A stator or rotor according to claim 2, wherein the circumferential support is formed of a series of laminations.

8. A stator or rotor according claim 2, wherein each of the plurality of teeth are formed of a series of laminations.

9. A stator or rotor according to claim 2, wherein glue is placed between the interlocking means and a protrusion.

10. A stator or rotor according to claim 2, wherein the plurality of teeth are over-moulded prior to receiving coil windings.

11. A stator or rotor according to claim 2, wherein the circumferential support has a recess on at least one side of a protrusion in which a side element of a tooth is mounted within to inhibit tangential movement of the tooth.

12. A stator or rotor according to claim 2, wherein the plurality of protrusions and plurality of teeth extend from the circumferential support in a radial direction away from a center point of the circumferential support.

13. A stator or rotor according to claim 3, wherein the plurality of protrusions and plurality of teeth extend from the circumferential support in a radial direction towards a center point of the circumferential support.

14. A stator or rotor according to claim 2, further comprising a mounting ring arranged to be mounted to the circumferential support and be coupled to coil windings placed on the plurality of teeth.

15. A stator or rotor according to claim 14, further comprising an inverter arranged to be mounted to the mounting ring to allow an electrical connection to be established between the inverter and at least one coil winding placed on a tooth.

16. An electric motor having a stator or rotor according to claim 2.

17. A method of manufacturing a stator or rotor comprising providing a plurality of teeth, wherein each tooth includes a recess with interlocking means formed within the recess, wherein the respective interlocking means do not extend beyond the recess formed within the respective teeth, and a circumferential support having a plurality of protrusions circumferentially distributed about the support, wherein each of the plurality of protrusions are resiliently deformable and arranged to engage with interlocking means within the recess of each tooth; placing coil windings around each of the plurality of teeth; and radially pressing each of the plurality of teeth on to a respective protrusion formed on the circumferential support so that the interlocking means formed within the recess of each tooth engage with the respective protrusion to inhibit radial movement of the tooth with respect to the circumferential support.

* * * * *